United States Patent
Garbagnati et al.

(10) Patent No.: US 7,044,290 B2
(45) Date of Patent: May 16, 2006

(54) CONVEYOR CHAIN

(75) Inventors: Carlo Garbagnati, Castello Brianza LC (IT); Norberto Cattaneo, Usmate-Velate MI (IT)

(73) Assignee: Regina Sud S.p.A., Borgo San Michele (IT)

( * ) Notice: Subject to any disclaimer, the term of this patent is extended or adjusted under 35 U.S.C. 154(b) by 0 days.

(21) Appl. No.: 11/035,981

(22) Filed: Jan. 18, 2005

(65) Prior Publication Data

US 2005/0155848 A1 Jul. 21, 2005

(30) Foreign Application Priority Data

Jan. 20, 2004 (IT) .................. MI20040014 U

(51) Int. Cl.
*B65G 17/06* (2006.01)

(52) U.S. Cl. ...................... 198/852; 198/850

(58) Field of Classification Search ............... 198/850, 198/851, 852, 853
See application file for complete search history.

(56) References Cited

U.S. PATENT DOCUMENTS

| | | | | |
|---|---|---|---|---|
| 3,768,631 A * | 10/1973 | Wahren | ........................ | 198/852 |
| 4,524,865 A * | 6/1985 | von Hofen | .................. | 198/852 |
| 4,893,709 A * | 1/1990 | Schroeder et al. | ........... | 198/852 |
| 5,803,236 A * | 9/1998 | Wahren | ........................ | 198/852 |
| 6,247,583 B1 * | 6/2001 | Coen et al. | .................. | 198/852 |
| 6,250,459 B1 * | 6/2001 | Coen et al. | .................. | 198/852 |
| 6,736,259 B1 * | 5/2004 | Funabashi | .................... | 198/852 |
| 6,758,328 B1 * | 7/2004 | Arai et al. | ................... | 198/852 |

FOREIGN PATENT DOCUMENTS

| | | |
|---|---|---|
| EP | 0083119 | 7/1983 |
| EP | 1078869 | 2/2001 |
| EP | 1238927 | 9/2002 |
| FR | 1435044 | 3/1965 |

\* cited by examiner

*Primary Examiner*—James R. Bidwell
(74) *Attorney, Agent, or Firm*—Jacobson Holman PLLC

(57) ABSTRACT

Conveyor chain including a plurality of modular components having an upper conveyance plate with each modular component having a rotation component projecting from the plate and defining a seat with concave surfaces with the seat being designed to receive a pivoting component suited to engage with the concave surfaces to rotate inside the rotation component around an axis perpendicular to the conveyance plane with the pivoting component and the rotation component presenting holes for receiving a pin parallel to the conveyance plane and nearly transversal to the chain running direction with the holes in the rotation component being elongated to allow rotation of the pin around the rotation axis of the pivoting component and with the pin being engaged with an adjacent modular component of the chain to allow its rotation outside the conveyance plane and with the conveyance plate presenting on one side a concave circle arc profile and on the opposite side a convex circle arc profile with the convex profile being designed to be drawn near the concave profile of an adjacent plate with the circle arcs described by the concave and convex profiles of the modular components having centers lying nearly on rotation axes of pivoting components of the chain.

14 Claims, 2 Drawing Sheets

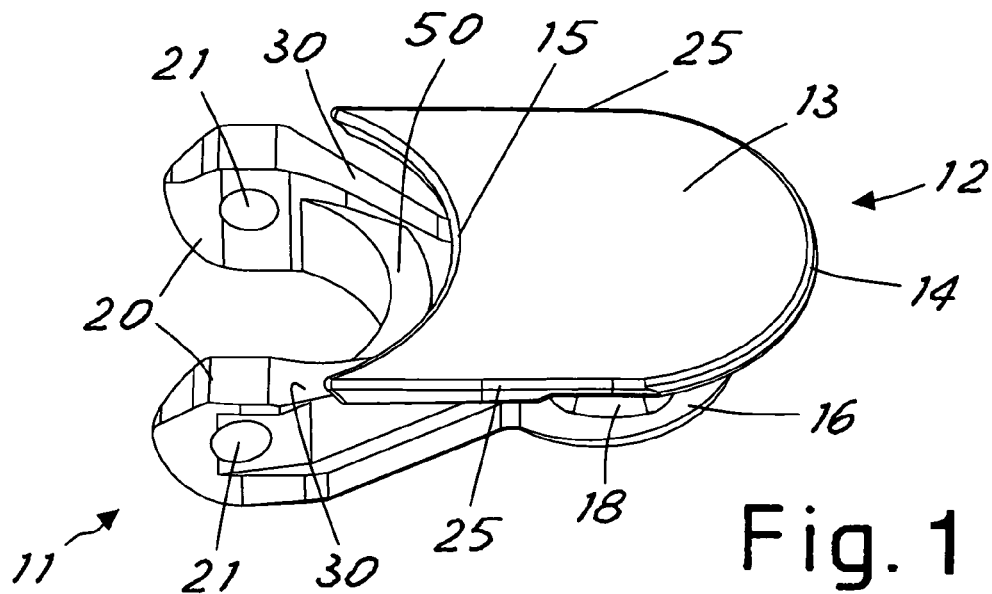
Fig. 1
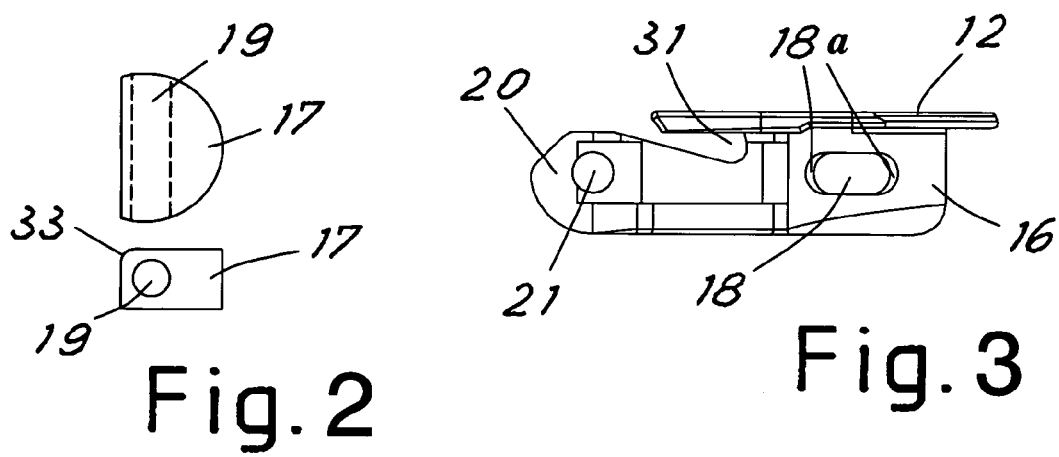
Fig. 2
Fig. 3
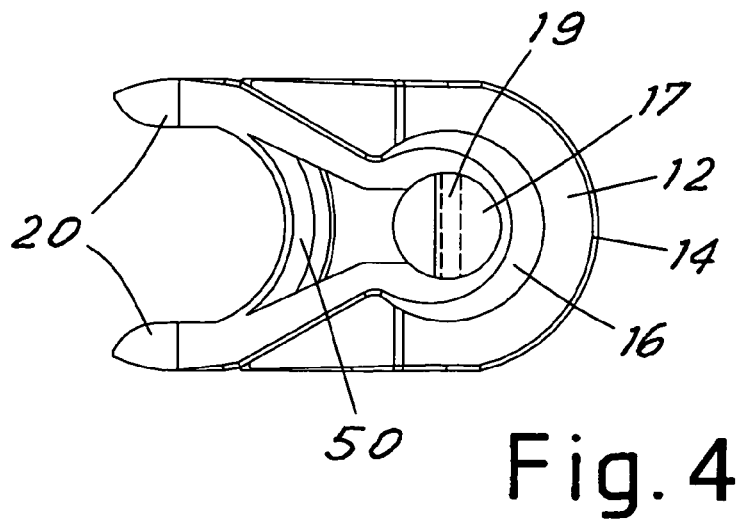
Fig. 4

CONVEYOR CHAIN

BACKGROUND OF THE INVENTION

1. Field of the Invention

The present invention relates to an improved conveyor chain to be used, for example, in an industrial-type conveyor.

2. State of the Prior Art

Using a conveyor chain comprising a plurality of modular components hinged together to form the chain is known in the art. These modular components typically present a flat upper conveyance surface suited for supporting the articles to be moved.

The application requirements in the industrial field have for sometime forced attention on the technical problem of having chains capable of following more or less winding paths both in the transport plane of the chain and outside it (think, for example, of the curves outside the horizontal work plane that the chains must be able to accomplish to be sent back to the beginning of the conveyor path).

To get this double degree of freedom in the conveyor chains (i.e., as mentioned, to have chains capable of curving inside and outside the conveyance plane), different technical solutions have been proposed. Some of these, for example, call for empty spaces between the chain conveyance components to allow them mutual rotation in the chain work plane; in fact, with a chain curvature the empty spaces on the inside of the curve are closed and the empty spaces on the outside of the curve are widened. But this solution does not allow realizing a stepless conveyance surface with all the obvious disadvantages deriving therefrom. Other solutions proposed in the prior art imply the use of a relatively high number of different components to realize a single modular unit of the chain. These solutions, while allowing operation of the chain even on very winding paths, imply rather high product complexity and consequently high production costs.

The general purpose of the present invention is to remedy the above-mentioned shortcomings by making available a conveyor chain allowing the realization of an almost stepless conveyor surface without voids while having a simple and economical modular structure.

SUMMARY OF THE INVENTION

In view of this purpose it was sought to provide in accordance with the present invention a conveyor chain comprising a plurality of modular components having an upper conveyance plate with each modular component comprising a rotation component projecting from said plate and defining a seat with concave surface with said seat being designed to receive a pivoting component suited to engage with said concave surfaces to rotate inside the rotation component around an axis perpendicular to the conveyance plane with said pivoting component and said rotation component presenting holes for receiving a pin parallel to the conveyance plane and nearly transversal to the chain running direction with the holes in the rotation component being elongated to allow rotation of the pin around said rotation axis of the pivoting component and with said pin being engaged with an adjacent modular component of the chain to allow its rotation outside the conveyance plane and with the conveyance plate presenting on one side a concave profile shaped like a circle arc and on the opposite side a convex profile shaped like a circle arc with the convex profile of a plate being designed to be drawn near the concave profile of an adjacent plate with the circle arcs described by said concave and convex profiles of the modular components having centers lying nearly on rotation axes of chain pivoting components.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings:

FIG. 1 shows a perspective view of a modular component of the chain in accordance with a preferred embodiment of the present invention;

FIG. 2 shows a top view and a side view of the pivoting component in accordance with the present invention;

FIG. 3 shows a side view of the modular component of FIG. 1;

FIG. 4 shows a bottom view of the modular component of FIG. 1;

DETAILED DESCRIPTION OF THE INVENTION

Figure 5:
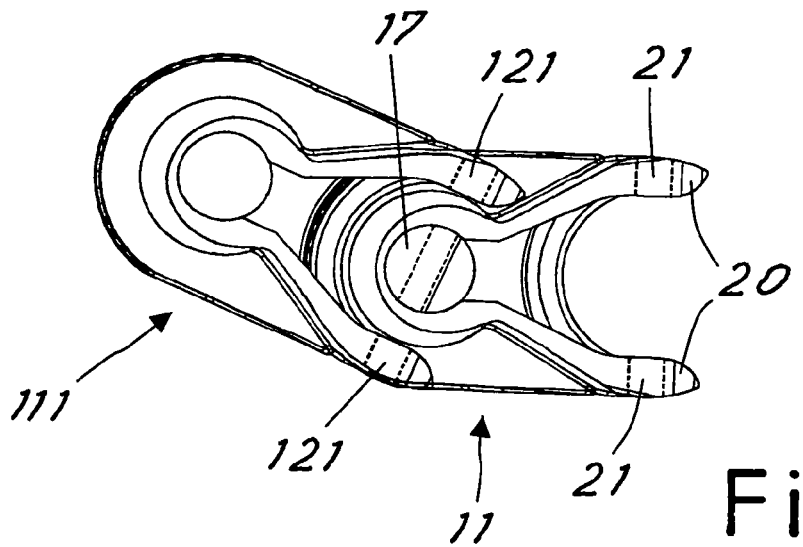
FIG. 5 shows a top view of two adjacent modular components of the chain.

With reference to the figures, FIG. 1 shows a modular component 11 of a conveyor chain in accordance with the present invention to be used for example in an industrial type conveyor system. Said modular component comprises a conveyance plate 12 having a flat top surface 13. The plate 12 has two sides 25 parallel to the chain conveyance direction and two circle arc profiles 14 and 15. In particular, the arc profile 14 is convex and is designed to be brought near the complementary concave arc profile 15 of an adjacent modular component as described in detail below. Advantageously the chain running direction will be such as to have a convex profile 14 at the head and the concave profile 15 at the tail. It is noted how the circle arcs of the concave and convex profiles 14, 15 extend along the entire dimension of the plate transversal to the chain running direction.

A rotation component 16 projects from the lower face of the conveyance plate 12. This rotation component 16 defines a semicylindrical seat within it designed to receive a pivoting component 17. The pivoting component 17 is shaped with a nearly semicylindrical form that allows it to rotate in the rotation component 16 around an axis perpendicular to the conveyance plane of the modular component 11 (conveyance plane that, indeed, corresponds to the plane containing the top surface 13 of the conveyance plate 12). As shown in FIG. 2, the pivoting component 17 advantageously has a beveled edge 33 designed to be turned downward when the pivoting component is inserted in its seat. This provision allows offering to the teeth of a chain-dragging ring (not shown in the figures) an engagement point shaped in an appropriate manner.

The rotation component 16 and the pivoting component 17 are provided with passing holes 18, 19 designed to receive in them a pin 22 for coupling of adjacent modular components 11, 111, 211. Indeed, in addition to being received in said holes 18, 19, the pin 22 is inserted in the holes 121 of a modular component 111 adjacent to the modular component 11. The holes 21 are made in the two arms 20 extending horizontally from the rotation component 16 of a modular component 11 to laterally embrace a rotation component of an adjacent modular component.

It is noted that the two holes 18 made in the rotation component 16 are formed elongated in the running direction of the chain to allow the pin 22 to rotate around an axis nearly coinciding with the rotation axis of the pivoting component 17. Indeed, when the pivoting component 17 rotates in the rotation component 16 the pin 22 rotates integrally therewith to ensure in addition that even the adjacent modular component 111 rotates as compared with the modular component 11 around the rotation axis of the pivoting component 17. This device allows the conveyor chain to bend in a certain conveyance plane to force the plates to rotate each in comparison with the others always around the rotation axes of the pivoting components of the chain.

Advantageously the axis of the pin 22 intersects the rotation axis of the pivoting component 17 in the rotation component 16.

It is noted that the holes 18 display two surfaces 18a inclined to the axis of the hole and adapted to receiving the pin 22 in support when it is in its maximum rotation position with respect to the rotation component 16.

In accordance with a preferred embodiment of the present invention the pin 22 lodges fixedly in the holes 21 by means for example of a prior art knurling or purposeful ribbing not shown in the figure. On the contrary, the pin 22 can rotate in the holes 17, 18 to allow the two adjacent modules 11, 111 to rotate mutually around an axis parallel to the chain conveyance plane (see FIGS. 6 and 7). Thus the chain can bend even to emerge from a predetermined working plane and be capable of following the winding paths that are not contained in a single plane.

Figure 6:
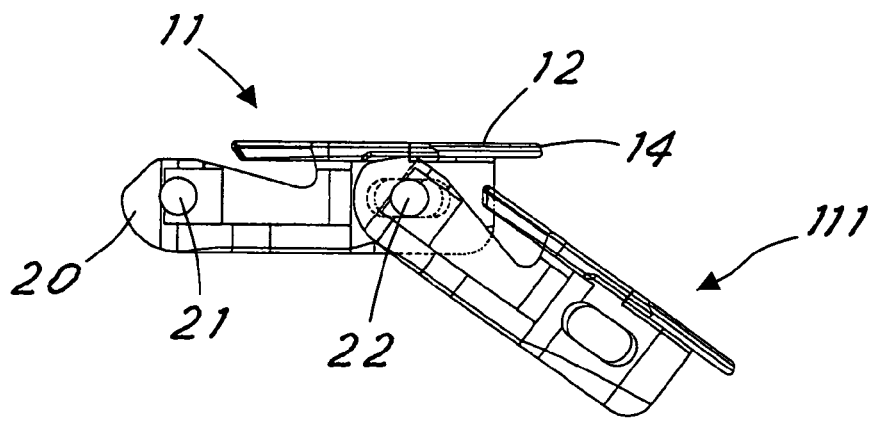
FIG. 6 shows a side view of two adjacent modular components of the chain.
Figure 7:
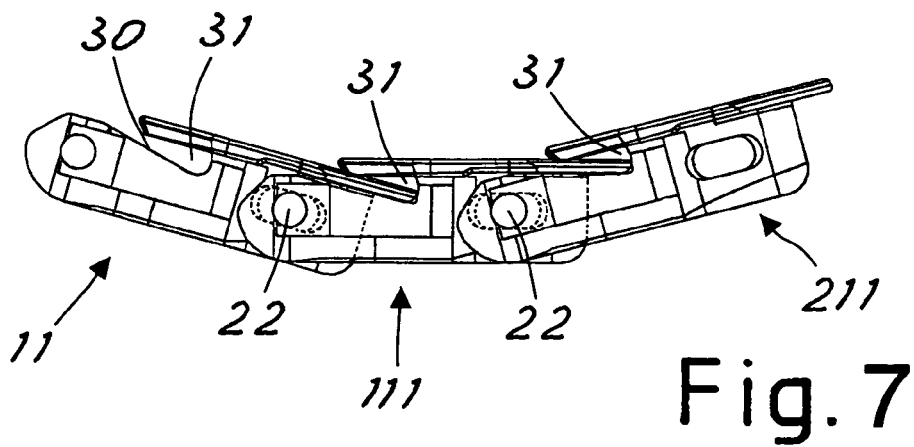
FIG. 7 shows a side view of a section of conveyor chain in accordance with the present invention.

It is also important to note the particular form of the arms 20 in which the holes 21 are made. These arms display inclined surfaces 30 forming an indentation 31 near the concave profile 15 of the conveyance plate 12. This indentation 31 allows the chain to bend not only downward (as shown in FIG. 6) but also upward (see FIG. 7 where three modular components 11, 111, 211 are shown). Indeed, the front part of the plate 12 goes to occupy the free space in the indentation 31 of the adjacent modular component when the chain is required to bend upward. As shown in FIG. 4, between the two arms 20 there is a reinforcing arc 50 that allows stiffening of the fork structure that otherwise would be weakened because of the relief realized with the inclined surface 30. The arc 50 is shaped in such a manner as to define a seat designed to receive the head of the rotation component 16 of an adjacent modular component.

Advantageously the rotation component 16 defines a semicylindrical engagement surface with the pivoting component 17 and remains open on the rear side turned towards the part from which extend the two arms 20. In accordance with a preferred embodiment of the present invention the rotation component 16 and the two arms 20 are made in a single stepless ribbing as shown in FIG. 4.

It is noted that the conveyor chain in accordance with the present invention allows realization of a stepless conveyor surface when it is found to follow a path contained in a certain conveyance plane. Indeed, the circle arc described by the convex profile 14 has a center lying on the rotation axis of the pivoting component 17 in the rotation component 16. Similarly, the circle arc defined by the concave profile 15 has its center lying on the rotation axis of a pivoting component housed in an adjacent modular component. This contrivance allows keeping the concave and convex profiles of two adjacent modular components 11, 111 always close together without leaving any empty space between the plates with any possible curvature taken on by the chain in a certain conveyance plane (see FIG. 5). Preferably, the conveyance plate 12 has a transversal dimension smaller than double the radius of the circle arcs described by the concave and convex profiles. In this manner, the chain can bend in a conveyance plane while avoiding two plates coming into contact opposite the end portions of the circle arc concave profile.

It is now clear that the preset purposes have been achieved. Indeed, a modular conveyor chain characterized in that a simple and satisfactorily economical modular structure is realized while being achieved with a relatively small number of components in each module. In addition, the special shape of the conveyance plate together with the special type of connection between the different modules allows embodiment of a chain capable of reducing to a minimum the empty spaces between the many conveyance surfaces.

Naturally the above description of an embodiment applying the innovative principles of the present invention is given by way of non-limiting example of said principles within the scope of the exclusive right claimed here. For example, the rotation component need not project below the conveyance plate but could overhang projecting below to be located beneath a plate of an adjacent modular component. In this case, the fork realized by the two arms 20 would be projecting directly beneath the conveyance plate of a modular component in a position suited to receiving a rotation component of an adjacent modular component.

What is claimed is:

1. Conveyor chain comprising
a plurality of modular components having an upper conveyance plate with each modular component comprising a rotation component projecting from said plate and defining an inner seat with concave surfaces with said seat receiving therein a pivoting component engaging with said concave surfaces to rotate inside the rotation component around an axis perpendicular to the conveyance plane with said pivoting component and said rotation component presenting holes for receiving a pin parallel to the conveyance plane and nearly transversal to the chain running direction with the holes in the rotation component being elongated to allow rotation of the pin around said rotation axis of the pivoting component with said pin being engaged with a modular component adjacent to the chain to allow rotation outside the conveyance plane and with the conveyance plate presenting on one side a concave circle arc profile and on the opposite side a convex circle arc profile with the convex profile of a plate being designed to be drawn near the concave profile of an adjacent plate with the circle arcs described by said concave and convex profiles of the modular components having centers lying nearly on rotation axes of pivoting components of the chain, said arc profiles extending along the entire dimension of the plate transversal to the chain movement direction.

2. Conveyor chain in accordance with claim 1, wherein said rotation component projects beneath the conveyance plate of each modular component.

3. Conveyor chain in accordance with claim 2, wherein from said rotation component extend horizontally a pair of arms designed to embrace laterally the rotation component of an adjacent modular component with in each of said arms there being made a hole to receive one end of opposite ends of the pin.

4. Conveyor chain in accordance with claim 3, wherein said rotation component and said arms are made up in a single stepless ribbing.

5. Conveyor chain in accordance with claim 3, wherein between said arms there is a reinforcing arc shaped in a manner complementary to a rotation component of an adjacent modular component.

6. Conveyor chain in accordance with claim 1, wherein the circle arc described by said convex profile of the conveyance plate of a modular component has its center lying on the rotation axes of the pivoting component in the rotation component of said modular component.

7. Conveyor chain in accordance with claim 3, wherein the circle arc described by said convex profile of the conveyance plate of a modular component has its center lying on the rotation axes of the pivoting component in the rotation component of said modular component and in that each of said arms has an inclined surface for defining an indentation near the concave profile of the conveyance plate designed to receive the convex profile of an adjacent plate when the chain bends upward.

8. Conveyor chain in accordance with claim 1, wherein the seat defined by the rotation component is nearly semi-cylindrical.

9. Conveyor chain in accordance with claim 1, wherein said pivoting component has a nearly semicylindrical form.

10. Conveyor chain in accordance with claim 1, wherein said holes in the rotation component have two surfaces inclined to the hole axis and designed to receive the pin in support when the latter is in its maximum rotation position as regards the rotation component.

11. Conveyor chain in accordance with claim 3, wherein said arms extend in the direction opposite the chain running direction.

12. Conveyor chain in accordance with claim 1, wherein the front edge of the plate as regards the chain running direction is the edge with convex profile.

13. Conveyor chain in accordance with claim 1, wherein in each modular component the axis of the pin intersects the rotation axis of the pivoting component.

14. Conveyor chain in accordance with claim 1, wherein the extension of the plate transversely to the chain running direction is less than double the radius of the circle arcs described by said concave profiles and convex profiles.

* * * * *